No. 741,715. PATENTED OCT. 20, 1903.
C. A. A. RAND.
REEL RAKE FOR REAPERS.
APPLICATION FILED MAR. 25, 1903.
NO MODEL. 6 SHEETS—SHEET 1.

Fig. 1.

Witnesses:
Inventor
Charles A. Anderson Rand

No. 741,715. PATENTED OCT. 20, 1903.
C. A. A. RAND.
REEL RAKE FOR REAPERS.
APPLICATION FILED MAR. 25, 1903.
NO MODEL. 6 SHEETS—SHEET 3.

Witnesses:
Inventor.
Charles A. Anderson Rand

No. 741,715. Patented October 20, 1903.

UNITED STATES PATENT OFFICE.

CHARLES A. ANDERSON RAND, OF CHICAGO, ILLINOIS, ASSIGNOR TO INTERNATIONAL HARVESTER COMPANY, A CORPORATION OF NEW JERSEY.

REEL-RAKE FOR REAPERS.

SPECIFICATION forming part of Letters Patent No. 741,715, dated October 20, 1903.

Application filed March 25, 1903. Serial No. 149,449. (No model.)

*To all whom it may concern:*

Be it known that I, CHARLES A. ANDERSON RAND, a citizen of the United States, residing at Chicago, in the county of Cook and State of Illinois, have invented a new and useful Improvement in Reel-Rakes for Reapers, of which the following is a complete specification.

The object of this invention is to simplify the construction and extend the latitude of operation of the switch-actuating mechanism on a reaper-stand.

One of the essential features of the invention consists in the peculiar relation of the switch-actuating spring with its coöperating parts, whereby the spring K operates to hold the switch in its open position, and the spring and switch acting in conjunction actuate the switch-latch lifter in its horizontally-vibrating movement by exerting a differential stress upon the pivotally-mounted index-quadrant which pivotally supports the said switch-latch lifter.

Another feature of the invention lies in the novel construction of the switch-latch lifter, in which an upwardly-extending arm $h^2$ thereon engages the switch-latch in such a manner and at such a predetermined time as to render inoperative the said switch-latch, thereby allowing the spring to hold the switch in its open position except when momentarily closed by the rollers on the rake-arms passing therethrough, and thus permit every rake to sweep the table.

The construction set forth in this invention will enable the rake-arms to be caused to sweep the platform every second, third, fourth, or fifth time, not at all except when the foot-trip is momentarily depressed, or every time except when the foot-lever is held depressed.

To whatever position the parts are adjusted and with whatever frequency they cause the rake-arms to sweep the table they are at all times susceptible to the action of the foot-lever—that is to say, in whatever position the index-lever is placed movement of the foot-lever will operate to lift, and thereby render inactive, the switch-latch. Heretofore the arrangement and construction of the switch-actuating mechanism in connection with the foot-trip have been such that when released by the latch the switch could swing open at a time having no definite relation to the position of the approaching rollers of the rake-arm, and in consequence the switch would occasionally intercept and stop the said roller. This difficulty has been overcome in the present invention by causing the switch to always open at a definite time relative to the approaching rollers.

While most of the elements comprising the switch-actuating mechanism in this invention may be regarded as modifications of corresponding parts already known in the art, yet for clearness it is thought best to state that the distinctively new features are the following: the arm $h^2$, projecting upwardly from the latch-lifter H and in a position adapting it to hold the latch J out of engagement with the switch-lock arm $e'$, the shoulder $j^3$ on the said switch-latch J, adapted to engage the arm $h^2$ when the index-lever is set at its lower limit, and thus permit the spring K swinging the index-quadrant and supported parts in against the worm, the spring K having the double function, as hereinafter set forth, and the foot-trip cam L, operating in connection with the latch-lifting device to trip the latch.

Referring to the drawings.

Figure 1:
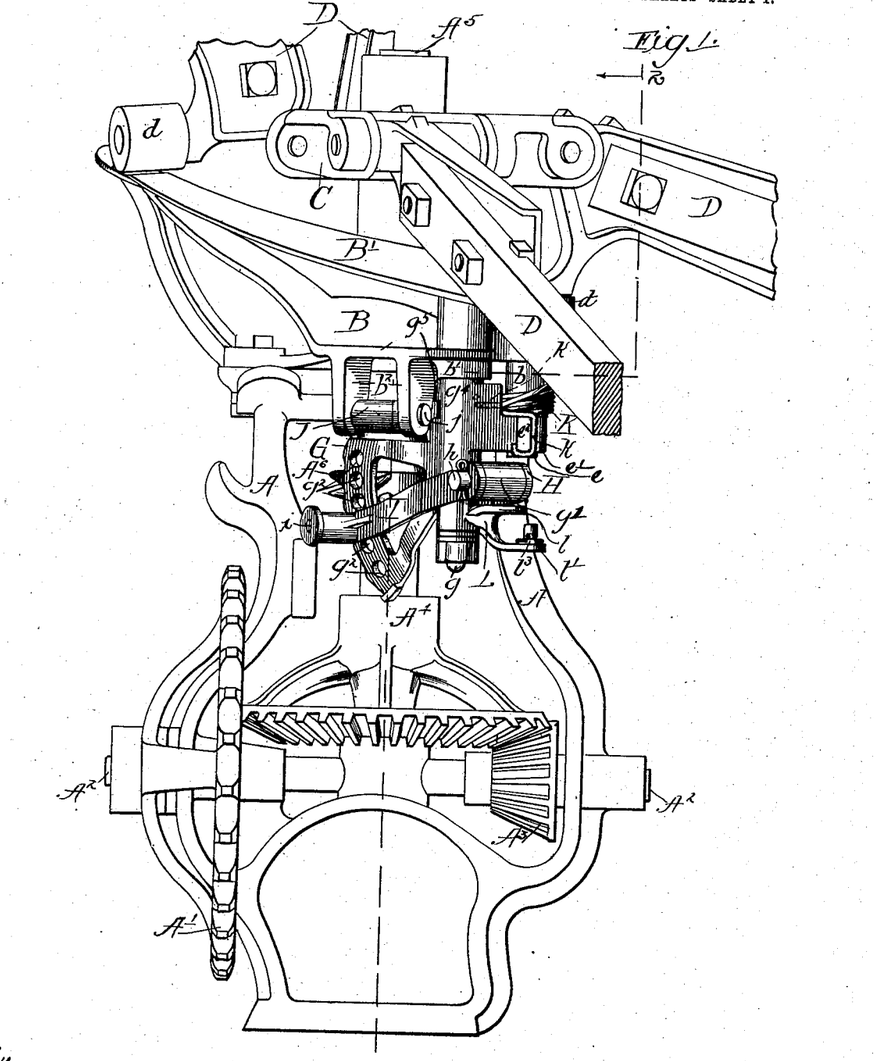
Figure 1 is a rear elevation of a reaper-stand with the rake-arm operating and tripping mechanism supported thereon.

In the drawings, A represents the rake-stand; B, the rake-cam, consisting, essentially, of the cam-track and bolted to the rake-stand, and C is the rake-head or spider, to which are pivotally secured the rake-arms D. A' is the sprocket-wheel, mounted on the shaft $A^2$, through which motion is imparted to the mechanism mounted on the rake-cam. On this shaft $A^2$ is secured the bevel-pinion $A^3$, which meshes with the bevel-gear $A^4$, mounted upon the vertical shaft $A^5$. To this shaft $A^5$ are secured the worm $A^6$ and the spider C. The spider C supports and drives the usual rake-arms D, which in turn are provided with antifriction-rollers $d$, adapted to follow the track on the cam B, and thus control the movement of the free end of said rake-arms. In construction the rake-arms comprise the rake-arm sockets and the rake-arms proper, only a fragment of the rake-arms showing, however, in Fig. 1; but for convenience in description both members will hereinafter be understood to be included in the term "rake-arm." Pivotally mounted upon the rake-cam B are the bridge B' and the switch E, which, with the other parts mentioned, may be of any preferred construction, as they are parts common to this type of machine. The function of the bridge and the switch is the same as that performed by the corresponding parts in machines of this class, the switch operating to either permit the roller $d$ of the rake-arm D to follow the regular cam-track, and thus allow said arm to sweep the platform, or to deflect the said roller upon the bridge B', which will operate to raise the arm above the table. The pivotal connection of the bridge will permit its free end to swing out and permit the roller $d$ to continue its travel on the regular cam-track or swing in when the roller has been deflected upon it and in this way form a continuous track in a position which will permit the rake-arm to sweep higher above the table in a manner well understood.

Figure 7:
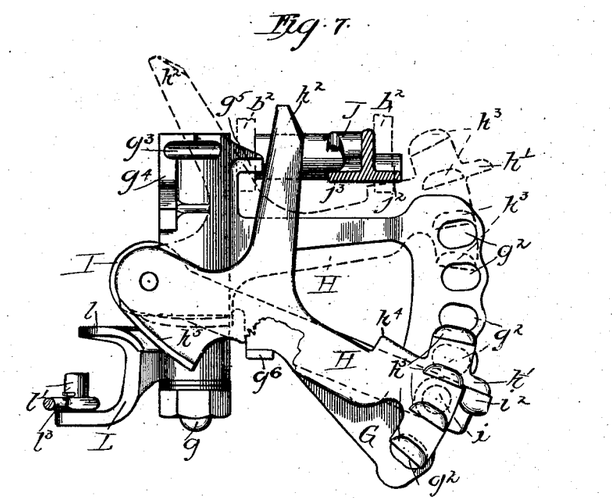
Fig. 7 is a vertical section through Fig. 5 as indicated by the line 7 7 in that figure, the latch-lifter and the index-quadrant being shown in side elevation and the switch-latch in transverse section.
Figures 8, 9:
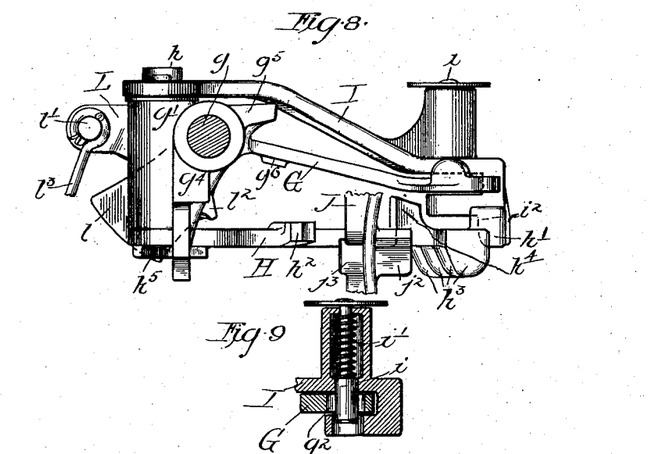
Fig. 8 is a plan view of the parts shown in Fig. 7.
Fig. 9 is a plan section of the spring-actuated index-lever-engaging pin.
Figure 10:
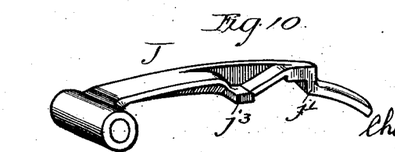
Fig. 10 represents a perspective view of the switch-latch.

The stem $e$ of the switch E journals in a bearing $b$ in the rake-cam casting B, (see Figs. 1 and 2,) its axis being vertically disposed, and the said switch is operated by the following-described mechanism:

Rigidly secured to the lower end of the stem $e$ of the switch E and as one piece with said switch is the switch-lock arm $e'$, and integral with the hub portion of this arm is the projecting lug $e^2$. (See Fig. 11.) Through this switch-lock arm $e'$ the switch itself is either released or held closed by the switch-latch in a way hereinafter more fully described. Parallel with the axis of movement of the switch extends the stub-shaft or, preferably, a bolt $g$, journaling in a bearing $b'$, formed in the rake-cam B. This bolt $g$ may be and, in effect, is a spindle as one piece with the bridge B'. Sleeved upon this bolt immediately below the bearing $b'$ is the index-quadrant G, as shown in the general views 1 and 2 or in the detail views 7 and 8. This index-quadrant is free to swing horizontally on its pivotal bearing within certain limits, and integral with the hub portion thereof and extending transversely thereto is the bearing $g'$, in which journals the spindle as one piece with the switch-latch lifter H. On the projecting end of the spindle $h$ sleeves the index-lever I, the free end of which is provided with a pin $i$, adapted to engage one of the series of apertures $g^2$ in the index-quadrant G. The pin $i$ is provided with a coil-spring $i'$ for holding it in engagement with the quadrant, as shown in detail in Fig. 9. The engaging portion of the index-lever is provided with a recess in which lies the edge of the segment of the index-quadrant, thus affording a two-point support for the said pin $i$, as is also shown in Fig 9. Integral with the free end of the index-lever I and beyond the periphery of the said index-quadrant is the stop $i^2$, which projects into the path of movement of the switch-latch lifter H, as shown in Figs. 7 and 8. On the switch-latch lifter H is a foot $h'$, adapted to rest upon the stop $i^2$ of the index-lever I, thus supporting the said switch-latch lifter in a position depending upon the height to which the index-lever is set. Projecting upwardly from the latch-lifter H is the arm $h^2$, situated in a position which will adapt it to engage and support the switch-latch J (see Figs. 7 and 13) when the pin $i$ on the index-lever I engages the lower aperture in the index-quadrant, this arm $h^2$ being for a purpose hereinafter more fully stated. On the latch-lifter H is a series of teeth $h^3$, designed to mesh with the worm $A^6$ when contacting the same and in this way effect the raising of the said latch-lifter.

Mounted on the hub $b$ of the switch-spindle bearing (see Figs. 1 and 2) is the coil-spring K, one end $k$ of which is turned down and engages the lug $e^2$ of the switch-lock arm $e'$, the other end of the spring-wire bearing in the grooved recess $g^3$ in the projecting lug $g^4$ on the upper portion of the hub of the index-quadrant G. (See Figs. 5 and 6.) The effect of this arrangement will be to cause the short arm $k$ to exert a stress tending to open the switch E (see Figs. 5, 6, and 11) and to cause the long arm $k'$ to exert a less stress, tending to rotate the index-quadrant, with its attached parts, to a position bringing the teeth $h^3$ of the latch-lifter to mesh with the teeth of the worm $A^6$. (See Fig. 5.) The lug $g^4$ is of a length sufficient to enable it to impinge the projecting lug $e^2$ on the latch-lifter arm $e'$. This lug $e^2$ serves as a stop to prevent movement of the quadrant G about its pivotal axis caused by the pressure of the spring K, and it also operates to disengage from contact the latch-lifter H and the worm $A^6$ when said spring K causes the switch E to swing open, as shown in Fig. 6.

Figure 2:
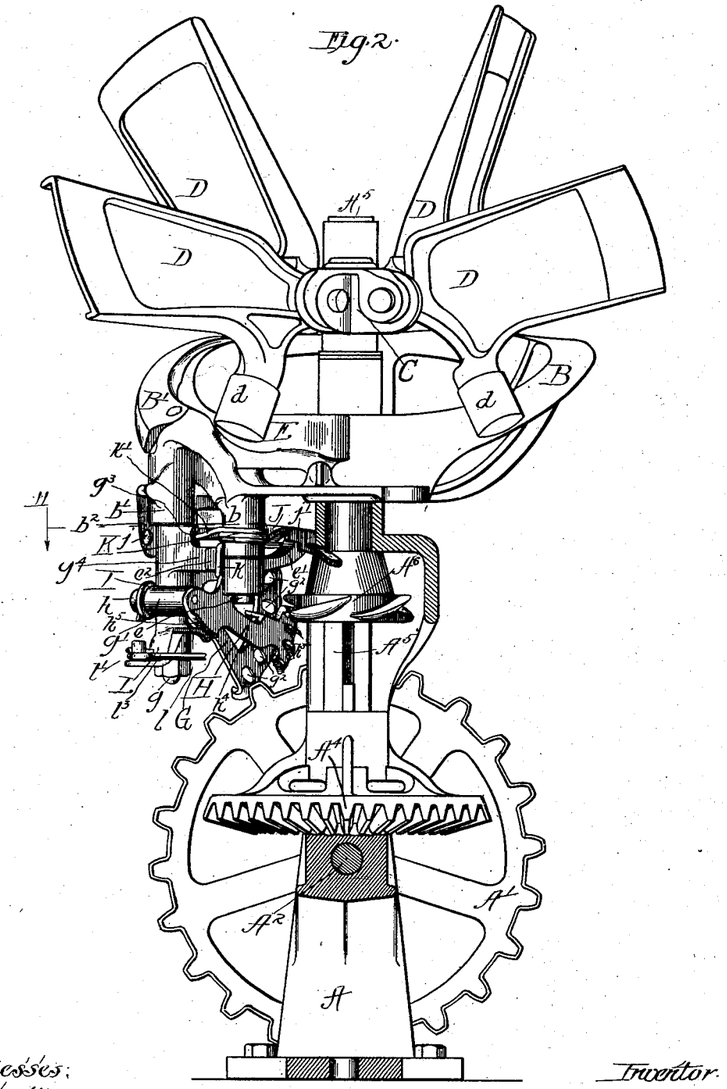
Fig. 2 is a side elevation, partly in section, of the same, taken as indicated by the broken line 2 2 on Fig. 1.
Figure 3:
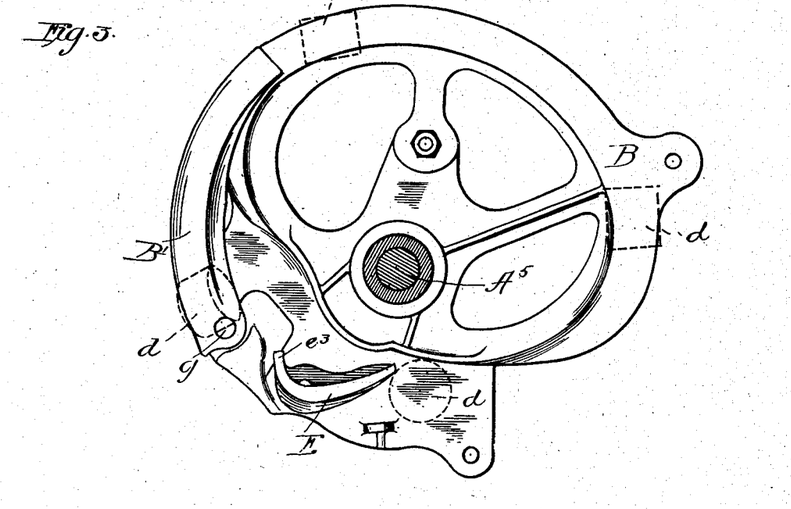
Fig. 3 is a plan of the rake-arm roller-cam, the switch and bridge being shown in their closed position.
Figure 4:
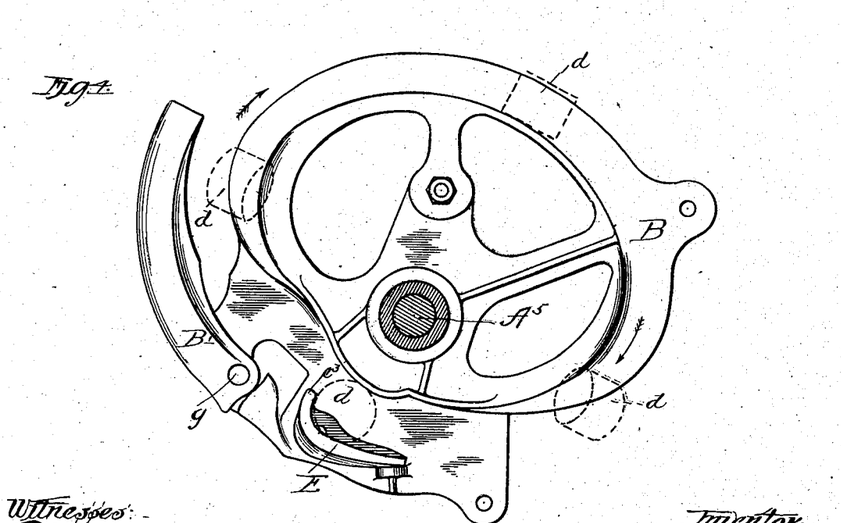
Fig. 4 represents the same view with the switch and bridge shown in their open position.
Figures 5, 6, 11:
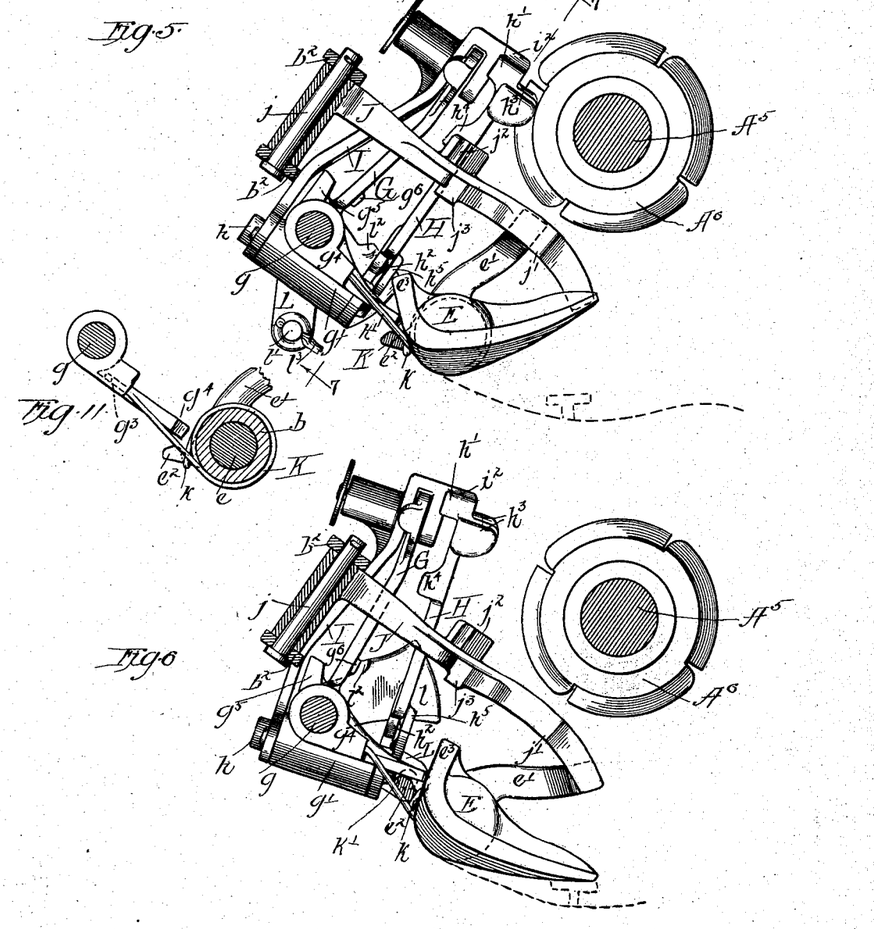
Fig. 5 is a plan of the switch and switch-operating mechanism, the switch being shown in its closed position and the toothed segment of the switch-latch lifter being shown in mesh with its actuating-worm.
Fig. 6 is a corresponding view with the switch shown in its open position and the toothed segment of the switch-latch lifter swung to a non-engaging position relative to the engaging worm.
Fig. 11 is a fragmentary plan section as indicated by the lines 11 11 in Fig. 2, illustrating the arrangement of the coil-spring in connection with the switch and index-quadrant.

The switch-latch J pivots on the pin $j$, (see Figs. 5 and 6,) which is supported by the downwardly-projecting ears $b^2$ $b^2$, integral with the rake-cam B, and near the outer end of said latch is the hook $j'$, adapted to engage the switch-lock arm $e'$, as shown in Figs. 2 and 5. $j^2$ is a foot (see Figs. 5 and 6) on the said latch J, so located that it will be impinged by the lug $h^4$ on the switch-latch lifter H as said lifter is caused to rise by its teeth engaging the worm $A^6$. $j^3$ is a small shoulder on the side of the latch J, the function of which is to engage the arm $h^2$ of the latch-lifter at a certain time and prevent the arm $k'$ of the spring K swinging the said latch-lifter. The projecting spur $g^5$ at the upper end of the boss of the index-quadrant G contacts one of the lugs $b^2$ and acts as a stop to limit the outward swing of said lever G.

Figure 12:
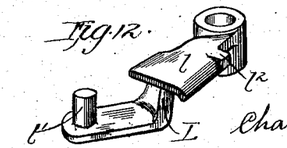
Fig. 12 is a view in perspective of the foot-trip cam.

Loosely sleeved upon the bolt $g$ and below the hub of the index-quadrant G is the foot-trip cam L, provided with the cam portion $l$, (see Fig. 12,) which bears against the cam portion $h^5$ of the latch-lifter H. $l'$ is a pin which engages the rod $l^3$, (see Fig. 8,) which actuates the foot-trip cam, and $l^2$ is a shoulder which contacts the projection $g^6$ on the index-quadrant G when the said foot-trip presses the said quadrant away from the worm.

The operation of the switch-actuating details is as follows: Should it be desired to have each alternate reel-rake sweep the platform, as might be required in excessively heavy grain, the index-lever I is raised and secured adjacent to the upper aperture $g^2$ in the index-quadrant by means of the pin $i$. The latch-lifter H through its foot $h'$, which rests upon the projecting lug $i^2$ of the index-lever I, will be correspondingly raised, so that the toothed segment thereon will engage the worm $A^6$ at a point near the bottom of said segment, the effect of which will be to lessen the distance between the lug $h^4$ on the said latch-lifter and the foot $j^2$ on the switch-latch J. In consequence of this the worm $A^6$, raising the latch-lifter H, will cause it to release the latch J and open the switch sooner. The rate of speed at which this latch-lifter is moved by the worm is so timed by the pitch of their respective teeth that, assuming that the switch is closed, only one roller $d$ of the rake-arms D will have passed around the switch E and upon the bridge $B'$ until the switch-latch lifter will have engaged and released the switch-latch J from the switch-lock arm $e'$, thus allowing the spring K to open the switch and permit the next roller $d$ to follow the regular cam-track, and thus cause that rake-arm to sweep the table. The rake-arm roller in passing through or on the inside of the switch presses the inwardly-curved arm $e^3$ outwardly or clear of its path and in so doing closes the switch to its locking position. The closing of the switch will at the same time bring the toothed segment of the switch-latch lifter again in mesh with the worm, and in another equal period of time the switch-latch will again be released and the switch again opened. The closed position of the switch is shown in Fig. 5 and its open position in Fig. 6. An inspection of Fig. 6 will show that if the inwardly-projecting arm $e^3$ of the switch be pressed by the roller in a direction to throw the switch to a closed position the long arm $k'$ of the spring K will bear against the projecting lug $g^4$ and cause the index-quadrant, with its supporting parts, to swing in contact with the said worm, as shown in Fig. 5. When the switch-latch is released, the above-referred-to parts are swung to the position shown in Fig. 6 by the short lug $e^2$ on the switch-lock arm bearing against the end of the long projecting lug $g^4$. The stress exerted by the spring K upon the index-quadrant and supported parts is greater in the opening or disengaging movement of these parts than in the closing or engaging movement thereof. This is due to the fact that in the opening movement the stress is applied to the moved parts through the long lever $g^4$ by the short and consequently more effective arm $k$ of the spring K acting through the lug $e^2$, while in the closing movement the operated parts are moved by a long arm $k'$ of the said spring K acting upon the short portion of the arm $g^4$. It follows that the spring K will when the switch-latch J is released swing the switch to its open position and simultaneously disengage the toothed segment on the switch-latch lifter from the worm. To cause the rake-arms to sweep the table every third, fourth, or fifth time, the pin $i$ is placed in the second, third, or fourth hole, respectively, from the top in the index-quadrant G. Because of this drop of the index-lever the switch-latch lifter will necessarily have to be raised a correspondingly greater distance, and as in the first-described operation the timing is such that the lug $h^4$ will not impinge the foot $j^2$ on the switch-latch until either two, three, or four rollers have passed over the bridge, when the latch will be released and the switch opened, as previously described, the next roller following the regular track on the cam, and thus allowing that rake-arm to sweep the table.

If the pin $i$ is made to engage the fifth hole from the top, the teeth on the switch-latch lifter will be allowed to drop down to a position in which engagement with the worm $A^6$ is no longer possible, and hence as there is no such engagement the switch-latch will remain locked and every roller made to pass over the bridge, the rake-arms serving only to reel the grain to the platform. In this position, however, if the foot-trip cam is swung around on its pivotal bearing it will cause the latch-lifter to be raised to a position where its teeth will engage the worm, and hence cause the switch-latch to be tripped. In this way the foot-trip acts indirectly to trip the latch, the tripping being effected in the usual manner by the worm raising the latch-lifter after it has once been engaged. This arrangement will insure the switch being released at a certain definite time relative to the movement of the other parts, and hence the point of the switch will never intercept the rollers of the rake-arm. If in this last position the foot-trip cam is held in contact with the switch-latch lifter, it will not only raise the lifter, but the shoulder $l^2$ on the said foot-trip cam will bear against the shoulder $g^6$ on the index-quadrant and press the tooth-rack out of engagement with the worm, thus rendering the tripping mechanism inoperative as long as so held.

Figure 13:
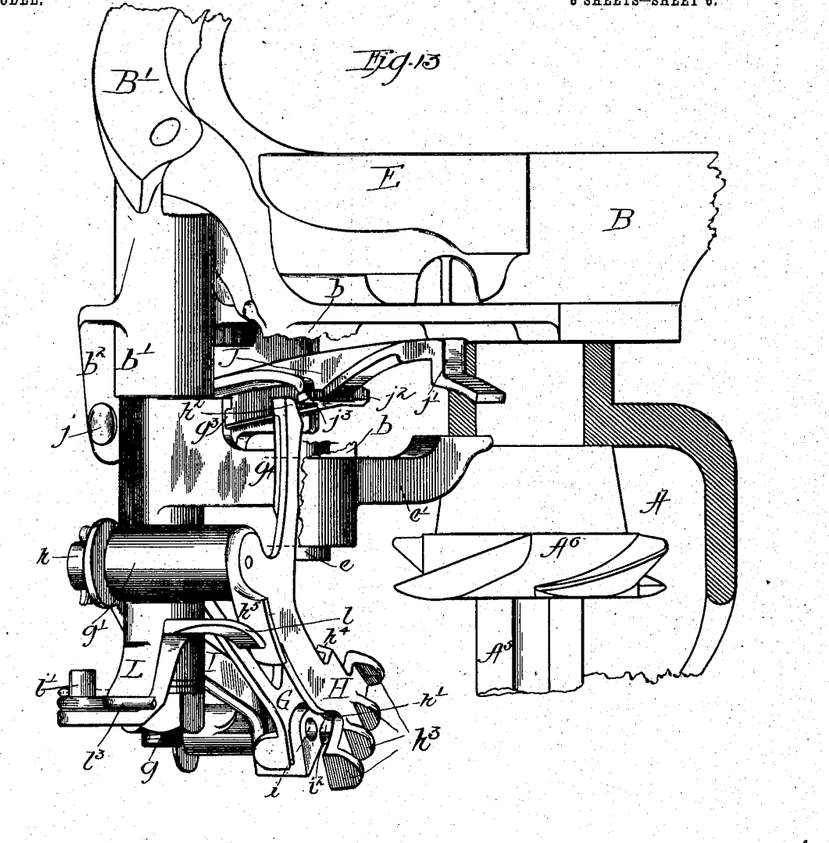
Fig. 13 is a fragmentary view in perspective of a portion of Fig. 2, showing the manner in which the upwardly-projecting arm on the switch-latch lifter sustains and holds the switch-latch from engaging the switch-lock arm.

If the pin $i^2$ is placed in the lower hole of the index-quadrant, the horizontally-extending arm thereof will have dropped so low that the upwardly-extending arm $h^2$ of the latch-lifter will have moved forward to a position where it will prevent the latch J from dropping over the lock-arm $e'$, as shown in Fig. 13. This will render the switch-latch inoperative and permit the switch to open for every roller, thus allowing each arm to sweep the table and "swath" the cut grain. The arm $h^2$ on the latch-lifter impinges the shoulder $j^3$ on the switch-latch J when the switch is closed, and thus prevents the index-quadrant and supported parts swinging in and out every time the switch is closed and opened.

It is of course necessary to the successful operation of the switch and actuating-rollers on the rake-arms that the distance between the successive rollers on the said rake-arms be slightly greater than the total length of the switch.

What I claim as my invention, and desire to secure by Letters Patent, is—

1. In a rake-arm-controlling device for reapers, in combination a switch, a switch-latch, means for releasing said switch-latch, and a spring interposed between said switch and a member of the switch-latch-releasing means, substantially as described.

2. In a rake-arm-controlling device for reapers, in combination a switch, a switch-latch, means for releasing said switch-latch, and a spring interposed between said switch and a member of the switch-latch-releasing means, the said spring exerting a stress tending normally to open said switch and to hold the said means for releasing said switch-latch in an operative position, substantially as described.

3. In a rake-arm-controlling device for reapers, in combination a switch, a short lever-arm as one piece therewith, a switch-latch, means for releasing said switch-latch, a long lever-arm in connection with such releasing means, and a spring interposed between said switch and said means for releasing said switch-latch, the said spring acting upon the short lever-arm of the switch and upon the long lever-arm of the switch-latch-releasing means, whereby a greater stress is exerted by the said spring to disengage than to engage said switch-latch-releasing means, substantially as described.

4. In a rake-arm-controlling device for reapers, in combination a switch, a switch-latch, means for releasing said switch-latch, a switch-lock arm, and mechanism in connection with said switch-latch-releasing means for engaging said switch-latch and thereby rendering it inoperative, substantially as described.

5. In a rake-arm-controlling device for reapers, in combination a switch, a switch-latch, means for releasing said switch-latch, a switch-lock arm, and a projecting arm on said switch-latch-releasing means, the said arm adapted at certain times to engage said switch-latch and thereby render it inoperative, substantially as described.

6. In a rake-arm-controlling device for reapers, in combination a switch, a switch-latch, a switch-latch lifter, switch-closing mechanism, a switch-opening spring, automatic means for positively disengaging the said switch-latch, and a foot-trip cam under the control of the operator for raising the said switch-latch lifter to an operative position with respect to the switch-latch, substantially as described.

7. In a rake-arm-controlling device for reapers, in combination a switch, a switch-latch, a switch-latch lifter for positively disengaging the said switch-latch, and a foot-trip cam under the control of the operator for raising the said switch-latch lifter to an operative position with respect to the switch-latch, substantially as described.

8. The combination of the reel raking-arms, their controlling-cam, a switch, a switch-latch pivoted to a fixed part of the frame by which the said switch is held in its closed position and by movement of which it is released when desired, a worm, a switch-latch lifter having a toothed segment adapted to engage said worm and thereby effect the release of said switch-latch, an adjustable stop against which the said switch-latch lifter falls whereby the latch-lifter may be given various initial positions, supporting mechanism for the said adjustable stop and switch-latch lifter, said supporting mechanism adapted to be rocked upon its pivotal bearing to move the said switch-latch lifter away from said worm, and a spring having the double function of exerting a stress tending to hold the switch open and a stress tending to hold the toothed segment of the switch-latch lifter in contact with the worm, all combined substantially as described.

9. The combination of the reel raking-arms, their controlling-cam, a switch, a switch-latch pivoted to a fixed part of the frame by which the said switch is held in its closed position and by movement of which it is released when desired, a worm, a switch-latch lifter having a toothed segment adapted to engage said worm and thereby effect the release of said switch-latch, an adjustable stop against which the said switch-latch lifter falls whereby the latch-lifter may be given various initial positions, an arm projecting upwardly from the said switch-latch lifter and adapted to be engaged by the said switch-latch when the adjustable stop supporting said lifter is in its lowest position, such engagement thereby rendering inoperative the switch-latch, supporting mechanism for the said adjustable stop and switch-latch lifter, said supporting mechanism adapted to be rocked upon its pivotal bearing to move the said switch-latch lifter away from the said worm, means for yieldingly holding the said switch in its open position, and means for yieldingly holding the switch-latch lifter out of engagement with said worm, all combined substantially as described.

10. In a rake-arm-controlling device for reapers, the combination of a switch, switch-actuating mechanism, a switch-latch, and means under the control of the operator for rendering inoperative the said switch-latch, substantially as described.

CHARLES A. ANDERSON RAND.

In presence of—
J. C. WARNES,
T. H. ALFREDS.